US009050802B2

(12) United States Patent
Uno

(10) Patent No.: US 9,050,802 B2
(45) Date of Patent: Jun. 9, 2015

(54) METHOD FOR MANUFACTURING LIQUID JETTING APPARATUS, METHOD FOR MANUFACTURING NOZZLE PLATE, AND LIQUID DROPLET JETTING APPARATUS

(71) Applicant: Jin Uno, Okazaki (JP)

(72) Inventor: Jin Uno, Okazaki (JP)

(73) Assignee: Brother Kogyo Kabushiki Kaisha, Aichi-ken (JP)

( * ) Notice: Subject to any disclaimer, the term of this patent is extended or adjusted under 35 U.S.C. 154(b) by 173 days.

(21) Appl. No.: 13/848,785

(22) Filed: Mar. 22, 2013

(65) Prior Publication Data

US 2014/0085380 A1    Mar. 27, 2014

(30) Foreign Application Priority Data

Sep. 26, 2012   (JP) .................................. 2012-212259

(51) Int. Cl.
    *B41J 2/15*      (2006.01)
    *B41J 2/14*      (2006.01)
    *B41J 2/16*      (2006.01)
    *B29C 65/48*     (2006.01)
    (Continued)

(52) U.S. Cl.
    CPC .............. *B41J 2/1433* (2013.01); *B29C 65/48* (2013.01); *B41J 2/14233* (2013.01); *B41J 2/1606* (2013.01); *B41J 2/162* (2013.01); *B41J 2/1629* (2013.01); *B41J 2/1632* (2013.01); *B41J 2/1634* (2013.01); *B41J 2/1642* (2013.01); *B41J 2/1646* (2013.01); *B41J 2002/14266* (2013.01); *B29L 2031/767* (2013.01); *B29C 66/3242* (2013.01); *B29C 66/72321* (2013.01); *B29C 66/742* (2013.01)

(58) Field of Classification Search
    CPC .. B41J 2/145; B41J 2002/14419; B41J 2/135; B41J 2/14145; B41J 2002/14443; B41J 2202/15
    See application file for complete search history.

(56) References Cited

U.S. PATENT DOCUMENTS 7,954,924 B2 *  6/2011  Linliu .............................. 347/47
8,657,411 B2 *  2/2014  Anderson et al. ................ 347/47
8,888,245 B2 * 11/2014  Kurosu et al. ................... 347/47

(Continued)

FOREIGN PATENT DOCUMENTS

| CN | 1550337   | 12/2004 |
|----|-----------|---------|
| CN | 101100129 | 1/2008  |

(Continued)

OTHER PUBLICATIONS

Machine English Translation for JP3108771.

(Continued)

*Primary Examiner* — Lamson Nguyen
(74) *Attorney, Agent, or Firm* — Frommer Lawrence & Haug LLP

(57) ABSTRACT

There is provided a method of manufacturing liquid jetting apparatus which includes a nozzle plate in which a nozzle configured to jet a liquid is formed, and a channel structure in which a liquid channel communicating with the nozzle is formed. The method of manufacturing liquid jetting apparatus includes, removing a part of a metal layer of a stacked body in which a resin layer and the metal layer are stacked without intervening an adhesive, to expose the resin layer partially, forming the nozzle in the resin layer such that, the nozzle opens in an area exposed through the metal layer, and joining the stacked body which is to be the nozzle plate in a case that the nozzle is formed, to the channel structure.

3 Claims, 10 Drawing Sheets

(51) Int. Cl.
*B29L 31/00* (2006.01)
*B29C 65/00* (2006.01)

(56) References Cited

U.S. PATENT DOCUMENTS

| | | |
|---|---|---|
| 2005/0001879 A1 | 1/2005 | Miyajima et al. |
| 2008/0049085 A1 | 2/2008 | Kataoka et al. |
| 2010/0252528 A1 | 10/2010 | Kataoka et al. |

FOREIGN PATENT DOCUMENTS

| | | |
|---|---|---|
| JP | H11-320874 | 11/1999 |
| JP | 3108771 | 9/2000 |
| JP | 2001-239671 | 9/2001 |
| JP | 2002-225282 | 8/2002 |
| JP | 2002-248773 | 9/2002 |
| JP | 2005-119222 | 5/2005 |
| JP | 2009-269331 | 11/2009 |

OTHER PUBLICATIONS

Notification of First Office Action issued for Chinese Patent Application No. 201310094865.4 dated Feb. 9, 2015.

* cited by examiner

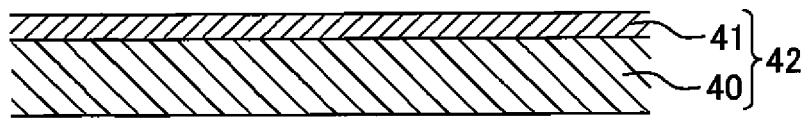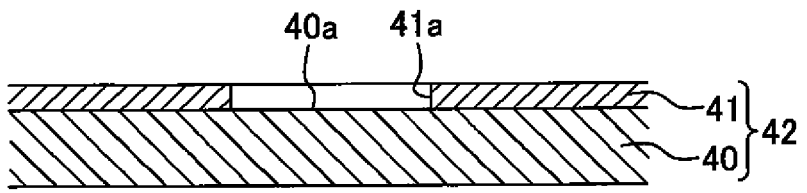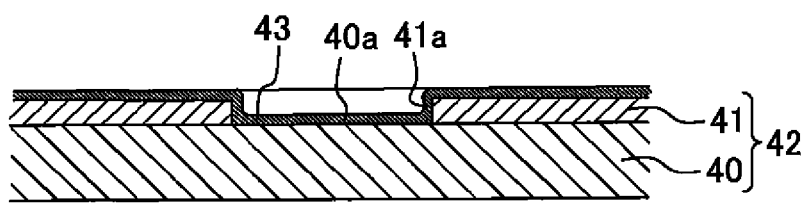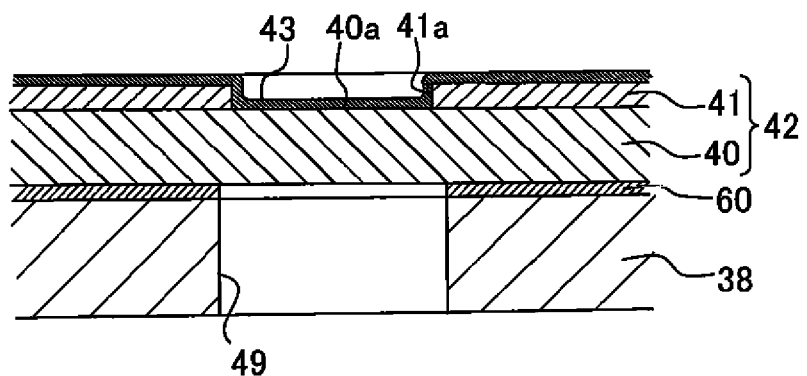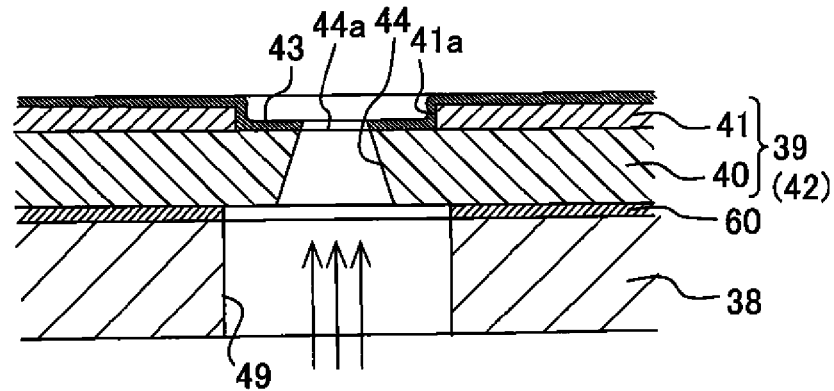

METHOD FOR MANUFACTURING LIQUID JETTING APPARATUS, METHOD FOR MANUFACTURING NOZZLE PLATE, AND LIQUID DROPLET JETTING APPARATUS

CROSS REFERENCE TO RELATED APPLICATION

The present invention claims priority from Japanese Patent Application No. 2012-212259, filed on Sep. 26, 2012, the disclosure of which is incorporated herein by reference in its entirety.

BACKGROUND OF THE INVENTION

1. Field of the Invention

The present invention relates to a nozzle plate of a liquid jetting apparatus, in which nozzles are formed.

2. Description of the Related Art

In liquid jetting apparatuses such as an ink-jet head, a plate made of a synthetic resin has been widely used for a nozzle plate in which nozzles are to be formed. However, the nozzle plate made of a synthetic resin material has a low strength or rigidity, and is soft. Therefore, a jetting surface is susceptible to wearing due to contact with a paper, and also susceptible to be damaged.

In this regard, a nozzle plate in which a metal layer is stacked on a resin layer in which the nozzles are to be formed, with a purpose of protecting and reinforcing a jetting surface, has hitherto been proposed. For instance, Japanese Patent No. 3108771 Publication discloses an ink-jet head in which a metal plate is stuck to a jetting surface of a head substrate made of a polymeric resin material, wherein a plurality of nozzles is opened in the jetting surface. Holes corresponding to the nozzles are formed in advance in the metal plate, and the metal plate is adhered to the head substrate. Accordingly, an area around jetting ports of the each of the nozzles is enclosed by the metal plate and is protected.

SUMMARY OF THE INVENTION

However, in the Japanese Patent No. 3108771 Publication, the resin layer (head substrate), in which the nozzles are formed, and the metal layer are stuck by an adhesive. Therefore, there is a possibility that some of the adhesive enters into the nozzle during the manufacturing process, thereby leading to defective jetting or inclined jetting due to the jetting of a liquid being hindered. For instance, in a case of sticking the metal plate to the resin layer after the nozzles are formed in the resin layer as in Japanese Patent No. 3108771, there is a possibility that an excessive adhesive flows into the nozzle at the time of sticking the metal plate.

Moreover, as in FIG. 5, it can be considered that forming nozzles 44 in a resin layer 40 by laser beam machining upon exposing the resin layer 40 partially by removing a part of a metal layer 41, after the resin layer 40 and the metal layer 41 are stuck by an adhesive 61. In this case, nozzles 44 are to be formed such that not only the resin layer 40 but also a layer of the adhesive 61 is pierced through. Consequently, there is a possibility that some of the adhesive bulges up around a jetting port 44a as shown in FIG. 6A. Moreover, there is a possibility that some of the melted adhesive may flow into the nozzle 44 as shown in FIG. 6B, or, remains to block the jetting port 44a.

An object of the present invention is to use a stacked body in which there is no adhesive between the resin layer and the metal layer, and to prevent occurrence of a jetting defect which may be caused due to the adhesive.

According to a first aspect of the present teaching, there is provided a method for manufacturing liquid jetting apparatus which includes a nozzle plate in which a nozzle configured to jet a liquid is formed, and a channel structure in which a liquid channel communicating with the nozzle is formed, the method including:

removing a part of a metal layer of a stacked body, in which a resin layer and the metal layer are stacked without intervening an adhesive, to expose the resin layer partially;

forming a nozzle in the resin layer such that the nozzle opens in an area exposed through the metal layer; and joining the stacked body, which is to be the nozzle plate in a case that the nozzle is formed, to the channel structure.

Since a surface of the resin layer on a side where the nozzle opens is covered by the metal layer, an area around a jetting port is protected by the metal layer. Moreover, there is no adhesive between the resin layer and the metal layer which form the stacked body. Therefore, there is no flowing in of adhesive into the nozzle during the process of manufacturing, and a problem of jetting of the liquid being hindered by the adhesive does not arise. In the present teaching, 'the area exposed through the metal layer' in which the nozzle opens refers to an area which is not covered by the metal layer. In other words, the term 'the area exposed through the metal layer' also includes a state of being covered by another layer such as a liquid repellent film after the metal layer has been removed.

According to a second aspect of the present teaching, there is provided a method of manufacturing nozzle plate in which a nozzle configured to jet a liquid is formed, including removing a part of a metal layer of a stacked body in which, a resin layer and the metal layer are stacked without intervening an adhesive, to expose the resin layer partially, and forming the nozzle in the resin layer such that, the nozzle opens in an area exposed through the metal layer.

Since there is no adhesive existing between the resin layer and the metal layer which form the stacked body, a problem of jetting of liquid from nozzle being hindered by the adhesive, does not arise.

According to a third aspect of the present invention, there is provided a liquid droplet jetting apparatus configured to jet a liquid, including a nozzle plate in which a nozzle configured to jet the liquid is formed, and a channel structure in which a liquid channel communicating with the nozzle is formed, and joined to the nozzle plate, wherein the nozzle plate includes a resin layer and a metal layer which are stacked without intervening an adhesive therebetween, the resin layer is exposed partially through the metal layer, and the nozzle is formed to open at an area of the resin layer exposed through the metal layer.

Since there is no adhesive existing between the resin layer and the metal layer of the nozzle plate, there is no flowing in of the adhesive into the nozzle, and the problem of jetting of liquid from nozzle being hindered by the adhesive does not arise.

According to the present teaching, since the surface of the resin layer on the side in which the nozzle opens is covered by the metal layer, the area around the jetting port of the nozzle is protected by the metal layer. Moreover, there is no adhesive between the resin layer and the metal layer which form the stacked body. Therefore, the problem of jetting of the liquid from the nozzle being hindered by the adhesive does not arise.

BRIEF DESCRIPTION OF THE DRAWINGS

FIG. 4A, FIG. 4B, FIG. 4C, FIG. 4D, and FIG. 4E are diagrams showing a process related to manufacturing of a nozzle plate;

DETAILED DESCRIPTION OF THE PREFERRED EMBODIMENTS

Figure 1:
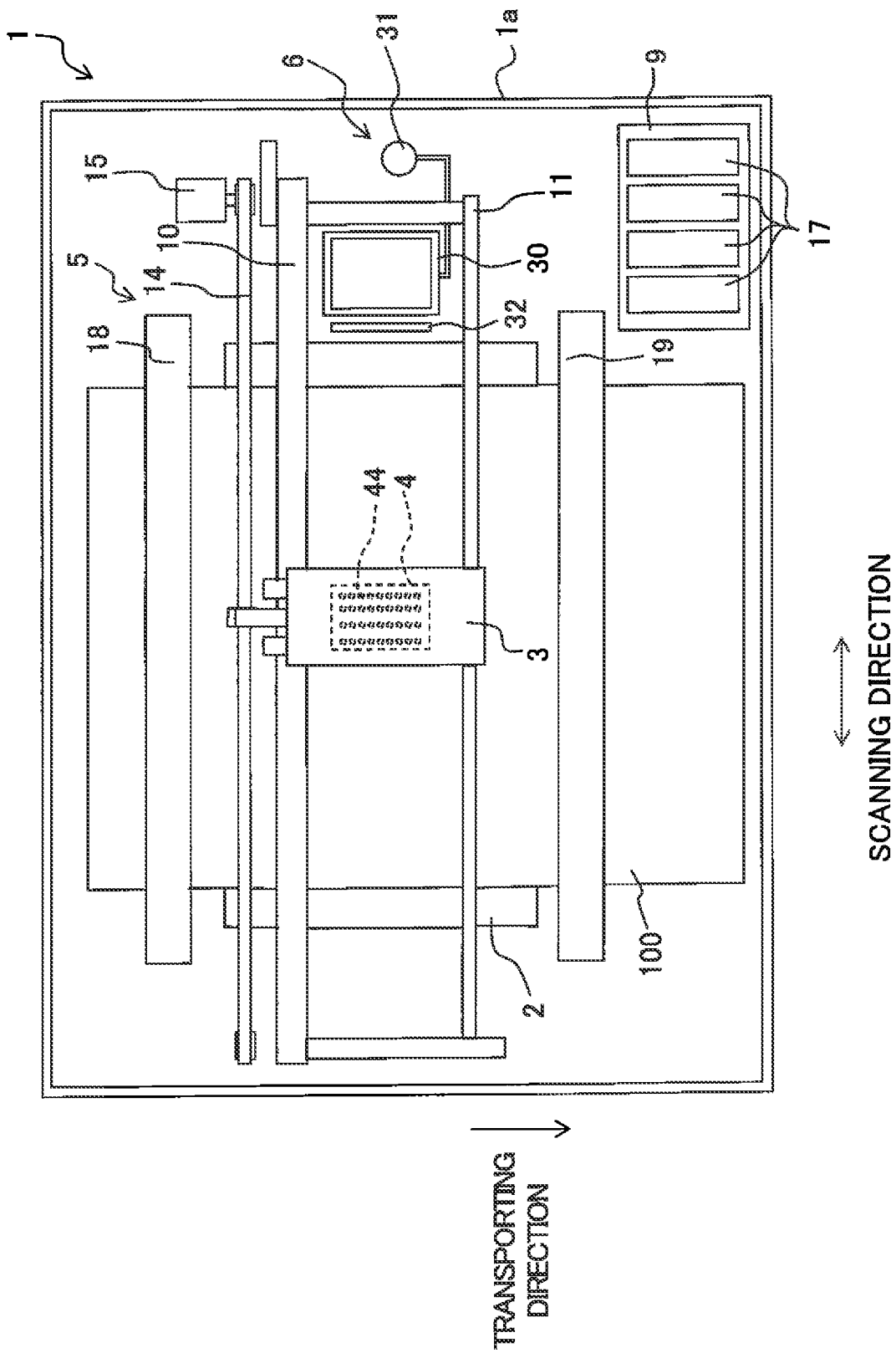
FIG. 1 is a schematic plan view of an ink-jet printer according to an embodiment of the present invention.

Next, an exemplary embodiment of the present teaching will be described below. The embodiment described below is an example in which the present teaching is applied to an ink-jet head as a liquid jetting apparatus. Firstly, a schematic structure of an ink-jet printer including an ink-jet head will be described below. In the following description, a frontward side of a plane of paper of FIG. 1 is defined as an upper side, and a rearward side of the plane of paper is defined as a lower side, and terms 'upper' and 'lower' which indicate directions are used. As shown in FIG. 1, an ink-jet printer includes a platen 2, a carriage 3, an ink-jet head 4, a transporting mechanism 5, and a maintenance mechanism 6.

A recording paper 100, which is an example of a recording medium, is placed on an upper surface of the platen 2. The carriage 3 is reciprocatable in a scanning direction along two guide rails 10 and 11, in an area facing the platen 2. An endless belt 14 is linked or fixed to the carriage 3. When the endless belt 14 is driven by a carriage driving motor 15, the carriage 3 moves in the scanning direction.

The ink-jet head 4 is installed on the carriage 3, and moves in the scanning direction together with the carriage 3. A plurality of nozzles 44 is formed in a lower surface of the ink-jet head 4, which is a surface on a rearward side of the plane of paper of FIG. 1. Moreover, as shown in FIG. 1, a holder 9 is provided to a printer main-body 1a of the printer 1. Four ink cartridges 17 storing inks of four colors namely, black, yellow, cyan, and magenta, respectively, are installed on the holder 9. The holder 9 and the ink-jet head 4 mounted on the carriage 3 are connected by tubes (not shown). The ink of four colors stored in the four ink cartridges 17 are supplied to the ink-jet head 4 via the tubes. The ink-jet head 4 jets the ink of four colors on to the recording paper 100 placed on the platen 2, from the plurality of nozzles 44.

The transporting mechanism 5 includes two transporting rollers 18 and 19 arranged to sandwich the platen 2 in a transporting direction. The transporting mechanism 5 transports the recording paper 100 placed on the platen 2, in the transporting direction by the two transporting rollers 18 and 19.

The ink-jet printer 1 makes the ink-jet head 4 reciprocating in the scanning direction together with the carriage 3, jet the inks on to the recording paper 100 placed on the platen 2. Also, the recording paper 100 is transported in the transporting direction by the two transporting rollers 18 and 19. An image and characters are recorded on the recording paper 100 by the abovementioned operation.

The maintenance mechanism 6 is positioned at a right side of the platen 2, in a range of movement of the carriage 3 in the scanning direction. The maintenance mechanism 6 includes a cap 30, a suction pump 31 connected to the cap 30, and a wiper 32.

The cap 30 is movable in a vertical direction. The cap 30 is arranged to move upward when the carriage 3 is at a position facing the cap 30. At this time, the cap 30 makes a close contact with the lower surface of the ink-jet head 4, and covers the plurality of nozzles 44. In this state, an inside of the cap 30 is depressurized by the suction pump 31. Accordingly, a suction purge in which the ink is discharged forcibly through each of the plurality of nozzles 44 is carried out. At this time, dust and air bubbles, or ink thickened due to drying inside the ink-jet head 4 are discharged from the plurality of nozzles 44. Therefore, a jetting defect of the nozzle 44 which may be caused due to the dust and air bubbles, is eliminated.

The wiper 32 is a member in the form of a thin plate formed of an elastic material such as rubber, and is arranged to stand at a position adjacent to the cap 30 in the scanning direction. In a state after the suction purge has been carried out, an ink is adhered to the lower surface of the ink-jet head 4. Therefore, after the suction purge, the cap 30 is separated from the lower surface of the ink-jet head 4, and then the carriage 3 is moved in the scanning direction. At this time, the wiper 32 moves relatively with respect to the ink-jet head 4 in a state of being in contact with the lower surface of the ink-jet head 4, and wipes off the ink adhered to the lower surface of the ink-jet head 4.

Figure 2:
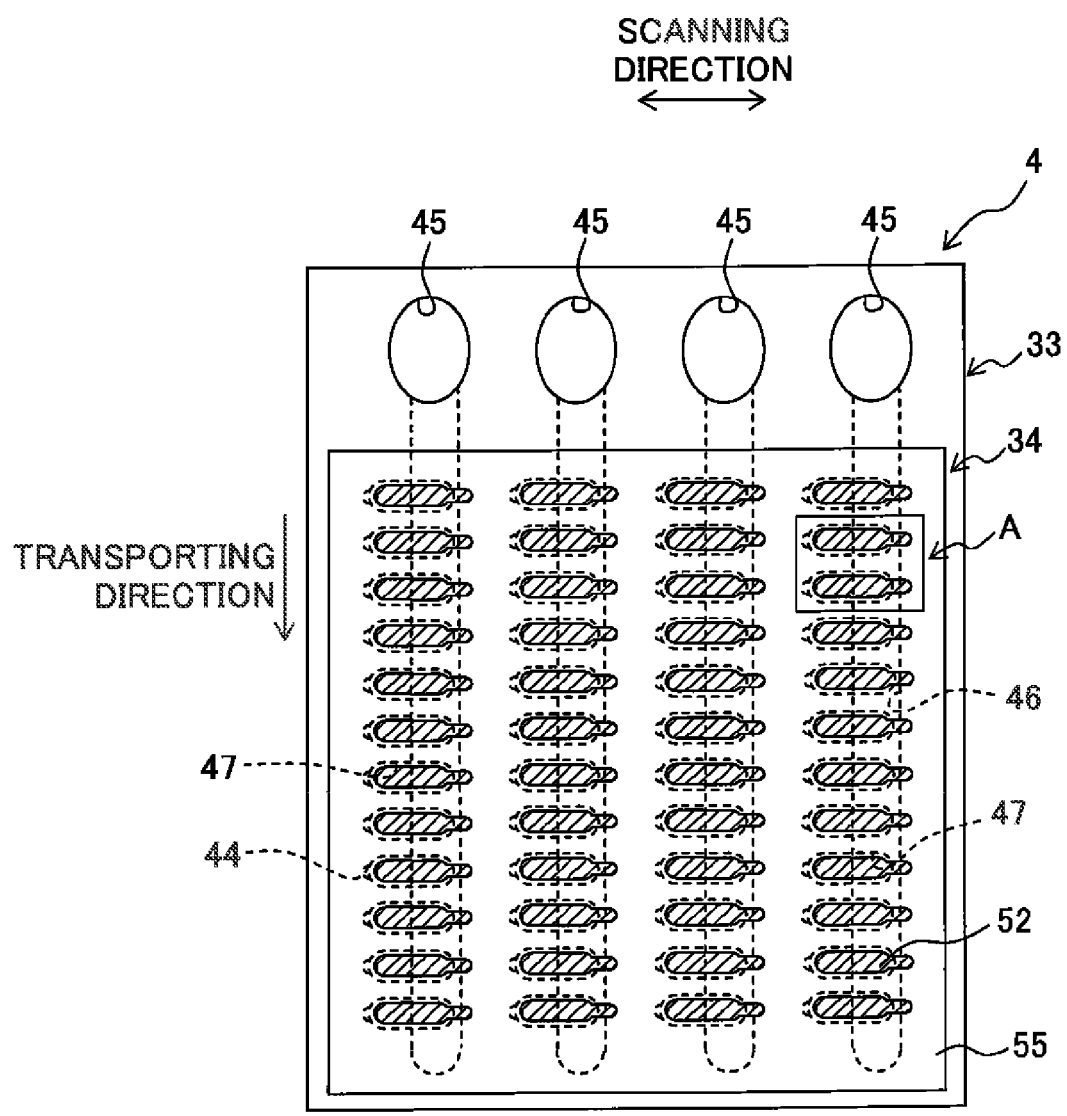
FIG. 2 is a plan view of an ink-jet head.
Figure 3A:
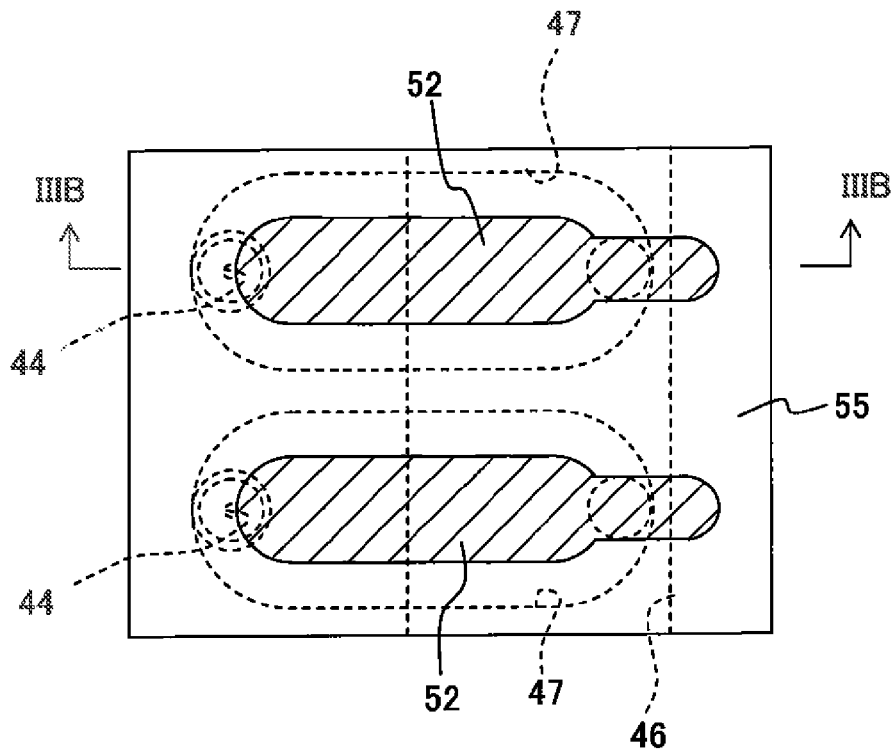
FIG. 3A is an enlarged view of a portion A in FIG. 2.
Figure 3B:
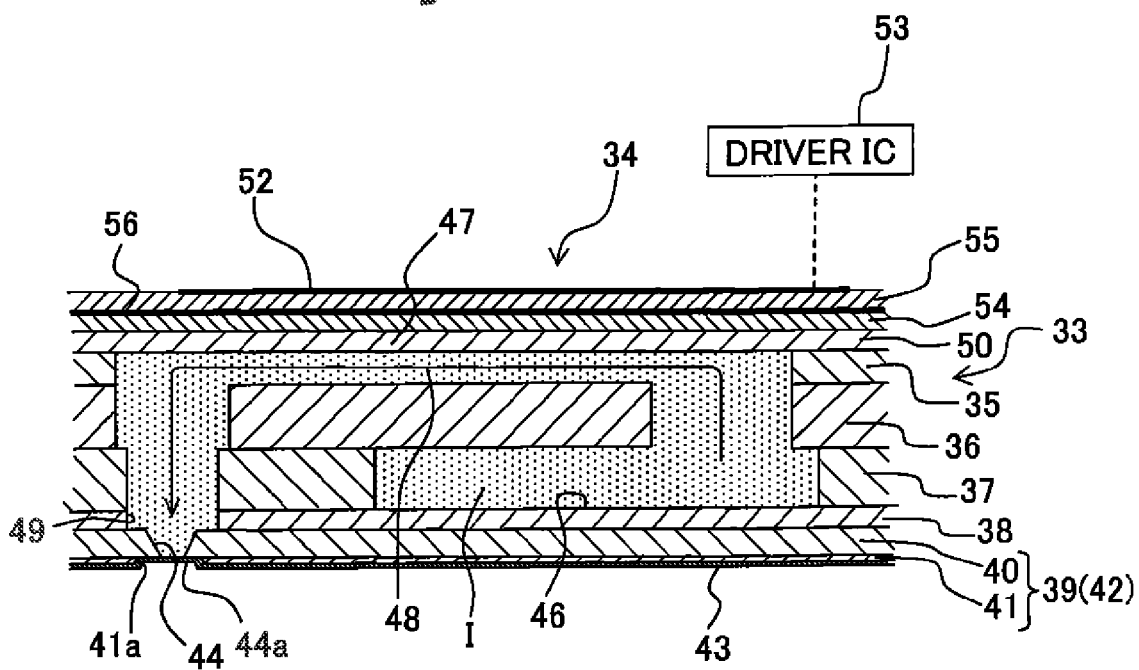
FIG. 3B is a cross-sectional view along a line IIIB-IIIB in FIG. 3A.

Next, the ink-jet head 4 will be described below. As shown in FIGS. 2, 3A, and 3B, the ink-jet head 4 includes a channel unit 33 and a piezoelectric actuator 34. In FIG. 3B, an ink filled in the ink channel is denoted by reference numeral 'I'.

Firstly, the channel unit 33 will be described below. As shown in FIG. 3B, the channel unit 33 includes five plates 35, 36, 37, 38, and 39 (hereinafter, 'plates 35 to 39') which are stacked. The plate 39 at the lowermost layer among the five plates 35 to 39 is a nozzle plate 39 in which the plurality of nozzles 44 is formed. The nozzle plate 39 includes a stacked body 42 of a resin layer 40 made of a synthetic resin such as polyimide and a metal layer 41 made of a metallic material such as stainless steel. As it will be described later, the resin layer 40 and the metal layer 41 are stacked in a state of being in a direct contact, and no adhesive is intervened between the resin layer 40 and the metal layer 41. The plurality of nozzles 44 which are cut through a direction of thickness of the resin layer 40 is formed in the resin layer 40. A cross-section of the plurality of nozzles 44 is a tapered shape. The metal layer 41 covers a lower surface of the resin layer 40 in which the jetting ports 44a of the plurality of nozzles 44 are formed. Moreover, a hole 41a which is slightly larger than the jetting port 44a is formed in the metal layer 41 to enclose the jetting port 44a of each nozzle 44. Accordingly, the jetting port 44a and an area surrounding the jetting port 44a on the lower surface of the resin layer 40 are exposed from the metal layer 41 through the hole 41a corresponding to the jetting port 44a.

A lower surface of the nozzle plate 39 is covered by a liquid repellent film 43 formed of a fluorine-contained resin such as PIM (polytetrafluoroethylene). When the liquid repellent film 43 covers the area surrounding the jetting port 44a exposed through the metal layer 41, the liquid repellent film 43 is capable of preventing the ink jetted from the nozzle 44 from being dripped and accumulated around the jetting port 44a. In FIG. 3B, the liquid repellent film 43 is formed on the entire area of the lower surface of the nozzle plate 39 including the metal layer 41. However, the present teaching is not restricted to such an arrangement. The liquid repellent film 43 may be covering at least the surrounding area of the jetting port 44a on the lower surface of the resin layer 40, and the liquid repellent film 43 may not be covering the metal layer 41.

In the nozzle plate 39, the metal layer 41 is stacked on the resin layer 40, and the area surrounding the jetting port 44a is enclosed by the metal layer 41. Therefore, even in a case in which a corner or an edge of the recording paper 100 transported has made a contact with the nozzle plate 39, the recording paper 100 hardly makes a direct contact with the resin layer 40, and the resin layer 40 is prevented from being worn away or being damaged. Particularly, when the liquid repellent film 43 formed in the area surrounding the jetting port 44a is damaged, a liquid repellent property is degraded and the ink is susceptible to remain around the jetting port 44a, thereby causing a jetting defect such as inclined jetting. With regard to this point, in the embodiment, the liquid repellent film 43 in the area surrounding the jetting port 44a is protected by the metal layer 41. Therefore, the liquid repellent film 43 is protected from being damaged.

Moreover, after the abovementioned suction purge has been carried out, there is a possibility that the ink discharged from the nozzle 44 accumulates at an inner side of the hole 41a in the metal layer 41. It is necessary to wipe off the ink assuredly from the hole 41a by the wiper 32. However, when the metal layer 41 is thick, the hole 41a becomes deep, and the wiper 32 hardly reaches an interior of the hole 41a. Even in a case in which the metal layer 41 is thick, when a diameter of the hole 41a is large, the wiper 32 can reach easily the interior of the hole 41a. However, when an object of protecting the surrounding of the jetting port 44a is taken into consideration, it is not preferable that the diameter of the hole 41a is excessively larger with respect to a diameter of the jetting port 44a. For this reason, for discharging assuredly the ink at the interior of the hole 41a by the wiper 32 after the suction purge, it is preferable that the thickness of the metal layer 41 is not more than a certain thickness. Concretely, the thickness in a range of 5 µm to 30 µm is preferable. A thickness of the resin layer 40 is mainly determined by an inner volume of the nozzle 44 which is necessary, and is in a range of 30 µm to 100 µm.

The remaining four plates 35, 36, 37, and 38 (hereinafter, 'plates 35 to 38'), which is located at the upper side among the five plates 35 to 39 forming the channel unit 33, are formed of a metallic material such as stainless steel. Channels such as manifolds 46 and pressure chambers 47 which communicate with the plurality of nozzles 44 is formed in the four plates 35 to 38.

Next, an arrangement of ink channels formed in the channel unit 33 will be described below. As shown in FIG. 2, four ink supply holes 45 are aligned in the scanning direction, in an upper surface of the channel unit 33. The inks of four colors are supplied to the four ink supply holes 45 from the four ink cartridges 17 of the holder 19 (refer to FIG. 1). Moreover, four manifolds 46, each extended in the transporting direction, are formed at an interior of the channel unit 33. The four manifolds 46 are connected to the four ink supply holes 45.

Furthermore, the channel unit 33 includes the plurality of nozzles 44 opening in a lower surface thereof, and the plurality of pressure chambers 47 communicating with the plurality of nozzles 44 respectively. As shown in FIG. 2, in a plan view, the plurality of nozzles 44 is arranged in four rows corresponding to the four manifolds 46. Also, the plurality of pressure chambers 47 is arranged in four rows corresponding to the four manifolds 46, similarly as the plurality of nozzles 44. As shown in FIG. 3B, each of the pressure chambers 47 communicates with the corresponding manifold 46.

As shown in FIG. 3B, a plurality of individual channels 48 branched from each manifold 46 reaching the nozzle 44 via the pressure chamber 47 is formed inside the channel unit 33.

Next, the piezoelectric actuator 34 will be described below. As shown in FIGS. 2, 3A, and 3B, the piezoelectric actuator 34 includes a vibration plate 50, piezoelectric layers 54 and 55, a plurality of individual electrodes 52, and a common electrode 56. The vibration plate 50 is joined to the upper surface of the channel unit 33 in a state of having covered the plurality of pressure chambers 47. The two piezoelectric layers 54 and 55 are stacked on an upper surface of the vibration plate 50. The plurality of individual electrodes 52 is arranged on an upper surface of the piezoelectric layer 55 which is the upper piezoelectric layer, so that each of the individual electrodes 52 faces the plurality of pressure chambers 47 respectively. The common electrode 56 is arranged between the two piezoelectric layers 54 and 55, to be spread over the plurality of pressure chambers 47.

Each of the plurality of individual electrodes 52 is connected to a driver IC 53 configured to drive the piezoelectric actuator 34. Whereas, the common electrode 56 is kept at a ground electric potential all the time. Moreover, a portion of the piezoelectric layer 55, which is the upper piezoelectric layer, sandwiched between the individual electrode 52 and the common electrode 56 is polarized in a direction of thickness thereof.

An operation of the piezoelectric actuator 34 at the time of jetting of ink from the nozzle 44 is as described below. When a drive signal is applied to a certain individual electrode 52 from the driver IC 53, an electric potential difference is developed between the individual electrode 52 and the common electrode 56 which is held at the ground electric potential. Accordingly, an electric field in a direction of thickness is generated in the portion of the piezoelectric layer 55 sandwiched between the individual electrode 52 and the common electrode 56. Moreover, since the direction in which the piezoelectric layer 55 is polarized and the direction of the electric field coincide, the piezoelectric layer 55 elongates in the direction of thickness which is the direction of polarization, and contracts in a planar direction of the piezoelectric layer 55. With the deformation due to contraction of the piezoelectric layer 55, a portion of the vibration plate 50 facing the pressure chamber 47 is bent to form a projection toward the pressure chamber 47. At this time, a volume of the pressure chamber 47 decreases and a pressure is applied to the ink inside the pressure chamber 47, and droplets of ink are jetted from the nozzle 44 communicating with the pressure chamber 47.

Next, manufacturing of the ink-jet head 4, and particularly, a process of manufacturing the nozzle plate 39 will be described below by referring to FIGS. 4A to 4E.

<Preparing Stacked Body>

Firstly, as shown in FIG. 4A, the stacked body 42 of the resin layer 40 and the metal layer 41 is prepared. The stacked body 42 includes the resin layer 40 and the metal layer 41, which are stacked in a state of being in a direct contact without intervening an adhesive in between. A cast method described below is exemplified as a method of manufacturing the stacked body 42 in which no adhesive is used.

In the cast method, the resin layer 40 is formed by solidifying a resin material after the resin material in a liquid faint is applied to one surface of the metal layer 41. The description will be made by citing an example of a case of forming a polyimide resin layer. Firstly, a polyimide precursor solution is applied to one surface of the metal layer 41 of a metal such as stainless steel. Next, a polyimide precursor layer is heated to a temperature of 200° C. or higher, and the polyimide precursor layer is solidified and becomes a polyimide layer. For improving adhesion strength of the resin layer 40 with respect to the metal layer 41, a surface roughening process may be carried out before applying the liquid-form resin. It is possible to carry out the surface roughening process by forming unevenness by roughening one surface of the metal layer by using a method such as chemical etching, or by using a micro blast machine.

<Process of Removing>

Figure 5:
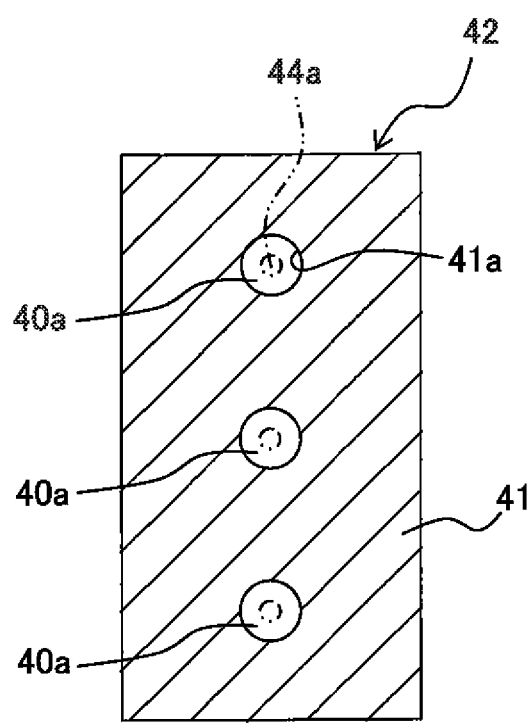
FIG. 5 is a partially enlarged plan view of a stacked body after a process of removing a metal layer.

As shown in FIG. 4B, the metal layer 41 is removed partially by forming the plurality of holes 41a in the metal layer 41. In FIG. 5, a portion remained of the metal layer 41 is hatched. As shown in FIG. 5, the hole 41a is formed to enclose a portion of the resin layer 40 in which the nozzle 44 is formed in the later process. Accordingly, the portion of the resin layer 40 in which the nozzle 44 is formed is exposed through the metal layer 41. In the following description, an area of the resin layer 40 which is not covered by the metal layer 41 will be called as an 'exposed area 40a'. It is possible to remove the metal layer 41 by a method such as wet etching. Concretely, after forming a mask by patterning a resist in an area of the metal layer 41 which is to be left without removing, a portion of the metal layer 41 which is not covered by the resist is removed by an etchant.

<Process of Forming Liquid Repellent Film>

Next, as shown in FIG. 4C, the liquid repellent film 43 is formed on the stacked body 42. Firstly, a liquid repellent material in the form of a liquid of a fluorine-contained resin is applied to the entire area of the stacked body 42 including the metal layer 41, and the exposed area 40a of the resin layer 40. Next, the liquid repellent material which has been applied is hardened by a heat treatment at a predetermined temperature according to the type of the fluorine-contained resin, and the liquid repellent film 43 is obtained.

<Process of Joining>

Next, as shown in FIG. 4D, the stacked body 42 is joined by an adhesive 60 to a metal plate 38 of the channel unit 33, in which a hole 49 communicating with the nozzle 44 is formed. At this time, the stacked body 42 and the metal plate 38 are joined upon aligning such that, the exposed area 40a of the resin layer 40 and the hole 49 in the metal plate 38 coincide. The metal plate 38 in which the hole 49 communicating with the nozzle 44 is formed corresponds to as 'channel structure' according to the present teaching. Moreover, in the diagram, the stacked body 42 is joined to only one metal plate 38. However, two or more metal plates forming the channel unit 33 may be joined to the stacked body 42 by the process of joining, provided that such an arrangement does not hinder nozzle formation by laser machining which will be described later. In this case, the two or more metal plates correspond to the 'channel structure' according to the present teaching.

<Process of Forming Nozzle>

Next, as shown in FIG. 4E, a laser beam is irradiated to the stacked body 42, through the hole 49 which has been formed in the metal plate 38, from a side which is joined to the metal plate 38. Accordingly, the nozzle 44 having a tapered shape cut through the resin layer 40 is formed to make an opening in the exposed area 40a of the resin layer 40.

Figure 6A:
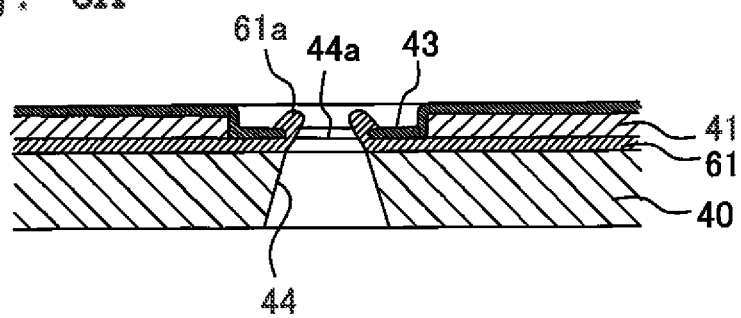
FIG. 6A and FIG. 6B are diagram describing an effect of an adhesive when a nozzle is formed in a stacked body in which, an adhesive is used.
Figure 6B:
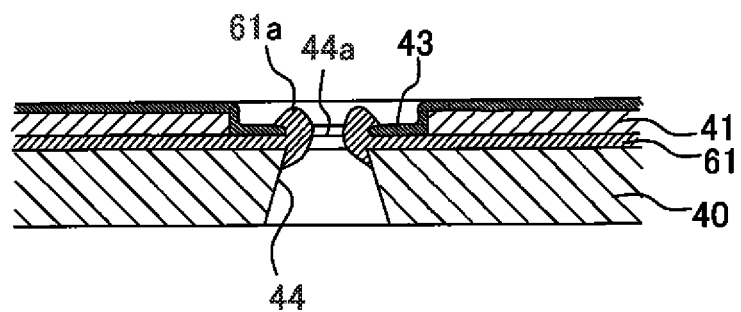

As it has already been mentioned, in the embodiment, the resin layer 40 and the metal layer 41 of the stacked body 42 are stacked without intervening the adhesive. Whereas, in a case in which the adhesive 61 which has thermoplasticity, exists between the resin layer 40 and the metal layer 41 as in FIG. 6A, when the nozzle 44 is formed in the resin layer 40, there is a possibility that a part 61a of the adhesive which is softened or melted by energy of the laser beam bulges up around the nozzle 40. Moreover, there is a possibility that a part 61b of the adhesive covers the jetting port 44a or enters into the nozzle 44 as shown in FIG. 6B. Such adhesive 61a and 61b, being a hindrance to jetting of ink from the nozzle 44, becomes a cause of a jetting defect such as misfiring and inclined jetting. In a case in which the adhesive 61 is a thermosetting adhesive such as an epoxy resin, a phenomenon such as softening or melting by the energy of the laser beam does not occur. However, workability of laser (absorptivity of laser beam) differs for the thermosetting adhesive from that for the resin layer 40 of a material such as polyimide. Therefore, machining speed differs from a case of the laser being irradiated only to the resin layer 40, and an ideal nozzle shape (tapered shape) is not achieved. As a result, there is a possibility of occurrence of a jetting defect such as an inclined jetting, similarly as in a case in which the adhesive having thermoplasticity has been used. Whereas, since there is no adhesive existing between the resin layer 40 and the metal layer 41 in the embodiment, there is no possibility that jetting of the ink is hindered by the adhesive.

Moreover, when the adhesive 61 is intervened between the resin layer 40 and the metal layer 41, the liquid repellent film 43 is to be formed on the adhesive 61 in the area surrounding the jetting port 44a. Therefore, in the portion of the adhesive 61 on which the liquid repellent film 43 is formed, the liquid repellent film 43 is susceptible to be exfoliated. However, in the embodiment, since the liquid repellent film 43 is in direct contact with the resin layer 40 in the area surrounding the jetting port 44a, the adhesion strength of the liquid repellent film 43 with respect to the resin layer 40 is high, and the liquid repellent film 43 is hardly exfoliated.

Furthermore, when a temperature for heat treatment on the liquid repellent film 43 is higher than an upper limit temperature of the adhesive 61, the adhesive 61 is either softened or melted, en is subjected to thermal decomposition. Moreover, an upper limit temperature of an adhesive which is generally used is not much high, and is about 250° C. at the most. Consequently, due to a constraint of the upper limit temperature of the adhesive 61, the choice of the liquid repellent film 43 is narrowed. With regard to this point, in the embodiment, since there is no adhesive existing in the stacked body 42, it is possible to select the liquid repellent film 43 having even higher temperature of heat treatment within a range not exceeding the upper limit temperature of the resin layer 40, and the degree of freedom of selection of the liquid repellent film 43 becomes higher. For instance, since the upper limit temperature of the polyimide is 440° C., it is possible to use the liquid repellent film 43 for which the temperature of heat treatment is 350° C. For instance, in a case of forming the liquid repellent film 43 of FIFE (polytetrafluoroethylene) which has the most superior liquid repellent property among the resin materials, after applying a dispersion liquid (made by dispersing PTFE fine particles in a solvent such as water), the dispersion liquid is baked by applying heat of 330° C. or higher than 330° C. Consequently, it is not possible to use PTFE in a case in which an adhesive for which the upper limit temperature is about 250° C. exists in the stacked body 42. However, in the present patent application, since there is no adhesive in the stacked body 42, it is possible to heat the stacked body 42 up to a temperature of 250° C. or higher than 250° C. Therefore, it is possible to form the liquid repellent film 43 of PTFE which is required to be heated to a temperature of 330° C. or higher than 330° C.

The stacked body 42 in the embodiment has been manufactured by a so-called cast method. However, the cast method is not a method for sticking the resin layer 40 and the metal layer 41 which have been formed separately in advance. In a method for sticking the resin layer 40 and the metal layer 41, when the metal layer 41 is thin, handling of such thin metal layer 41 is difficult. For instance, at the time of sticking the metal layer 41 to the resin layer 40, there is a possibility of getting wrinkles in the metal layer 41, or the metal layer 41 getting torn away. Moreover, even while transporting the metal layer 41 till sticking to the resin layer 40, there is a possibility of bending or breaking of the metal layer 41 even by a small vibration. With regard to this point, in the embodiment, since a handling of the metal layer 41 for sticking the metal layer 41 to the resin layer 40 is unnecessary, even in a case in which the metal layer 41 is thin, it is easy to form the stacked body 42.

Next, modified embodiments in which various modifications are made in the embodiment will be described below. Same reference numerals are assigned to components which are similar to the components in the embodiment, and description of such components is omitted.

Figure 7A:
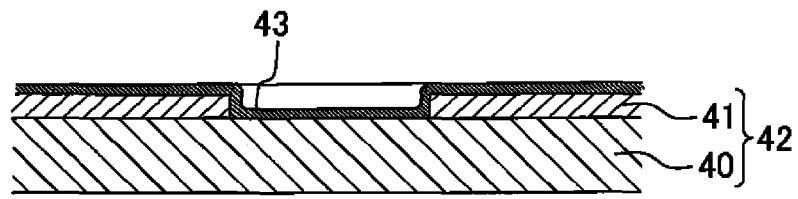
FIG. 7A, FIG. 7B, and FIG. 7C are diagrams describing a process of forming n nozzle and a process of joining, from among processes related to manufacturing of a nozzle plate according to a modified embodiment of the present invention.
Figure 7B:
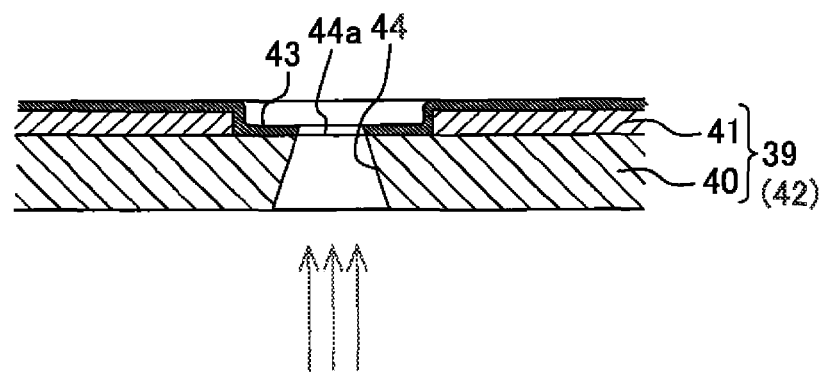
Figure 7C:
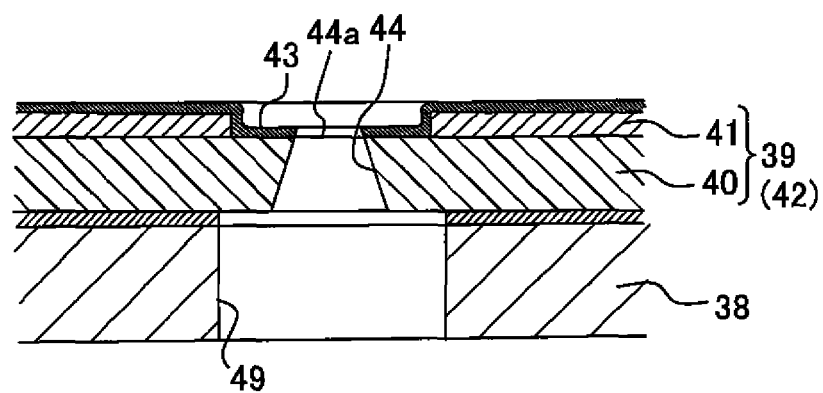

As shown in FIGS. 4A to 4E, in the embodiment, the nozzle 44 is formed in the resin layer 40 of the stacked body 42 after joining the stacked body 42 to the metal plate 38 in which the hole 49 which communicates with the nozzle 44 is formed. However, as shown in FIGS. 7A to 7C, the metal plate 38 may be joined to the nozzle plate 39 after forming the nozzle 44 in the resin layer 40 of the stacked body 42.

Figure 8A:
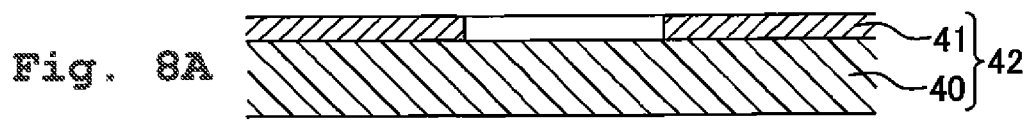
FIG. 8A, FIG. 8B, and FIG. 8C are diagrams describing a process of forming a nozzle and a process of forming a liquid repellent film in particular, from among processes related to manufacturing of a nozzle plate according to another modified embodiment of the present invention.
Figure 8B:
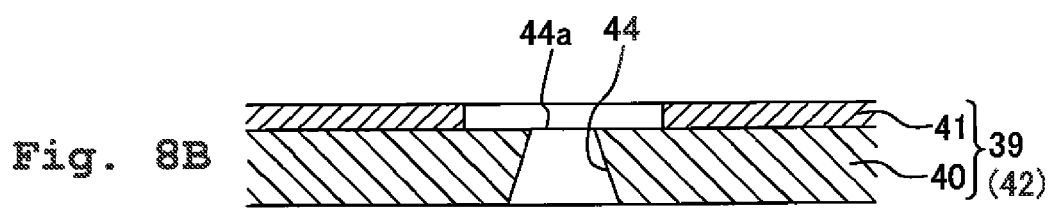
Figure 8C:
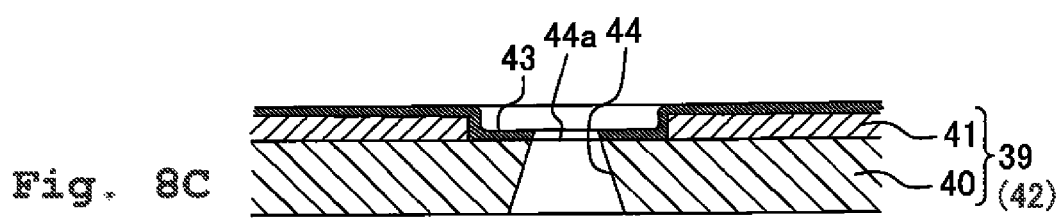

As shown in FIG. 4A to FIG. 4E, in the embodiment, the nozzle 44 is formed in the resin layer 40 after forming the liquid repellent film 43 on the stacked body 42. However, as shown in FIGS. 8A to 8C, the liquid repellent film 43 may be formed in the area surrounding the jetting port 44a on the surface of the nozzle plate 39 after forming the nozzle 44 in the resin layer 40 of the stacked body 42.

Figure 9A:
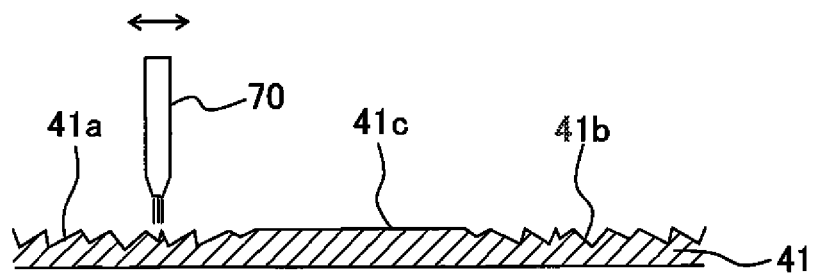
FIG. 9A and FIG. 9B are diagrams describing a process of surface roughening of a metal layer in still another modified embodiment of the present invention.
Figure 9B:
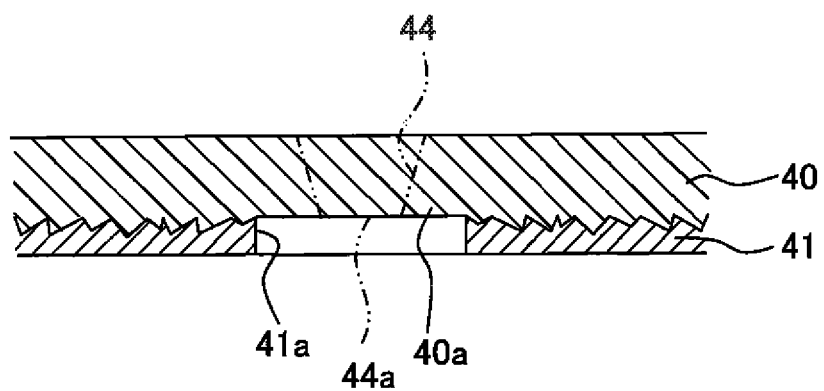

In a case in which the surface roughening process is carried out on the metal layer 41 before applying the resin material in liquid form to the metal layer 41, an uneven rough surface of the metal layer 41 is transferred to a surface of contact with the metal layer 41 of the resin layer 40, and the same unevenness (roughness) is formed. At this time, in a case in which the nozzle 44 is formed upon removing a part of the metal layer 41 such that the nozzle 44 opens in the exposed area 40a of the resin layer 40, there is an uneven shape as described above near the jetting port 44a. Therefore, there is a possibility of occurrence of inclined jetting. Accordingly, it is preferable to carry out the surface roughening process only on an area 41b of the metal layer 41 as shown in FIG. 9A, which is left without being removed in the subsequent process of removing (FIG. 9B), and not to carry out surface roughening process on an area 41c which is removed in the process of removing. In this case, when the nozzle 44 is formed in the resin layer 40, no unevenness (roughness) is formed in the area surrounding the jetting port 44a.

Figure 10A:
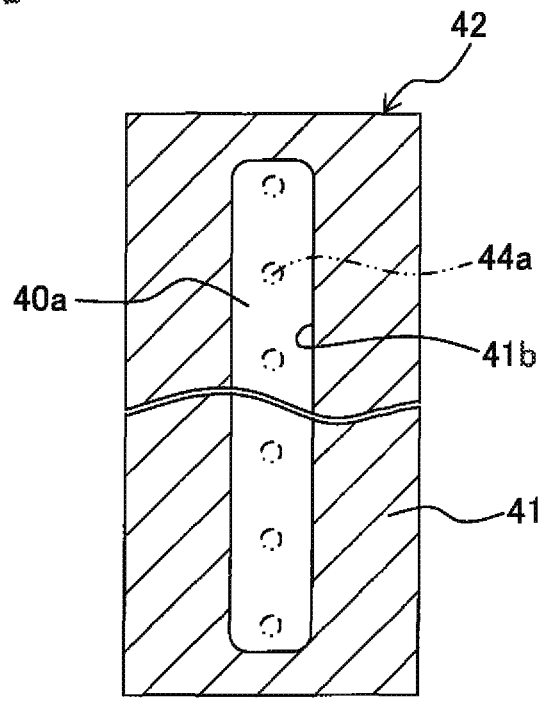
FIG. 10A and FIG. 10B are partially enlarged plan views of a stacked body after a process of removing a metal plate, according to still another modified embodiment of the present invention.
Figure 10B:
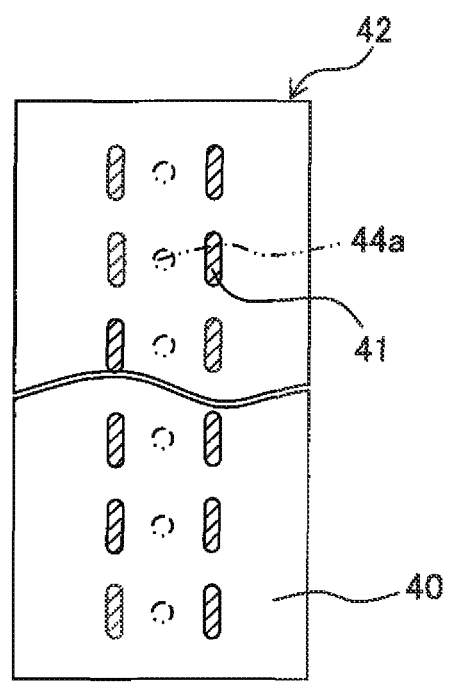

It is possible to change appropriately an area of removing the metal layer 41 in the process of removing. For instance, as shown in FIG. 10A, a hole 41b may be formed to enclose an overall area of the resin layer 40 in which one of row of nozzles is formed. Moreover, conversely, the metal layer 41 may be left only around an area in which the jetting port 44a is formed, and the rest of the metal layer 41 may be removed entirely. For instance, as shown in FIG. 10B, only the metal layer 41 having a shape of an (isolated) island may be left around the area of the resin layer 40 in which each jetting port 44a is formed, and the rest of the metal layer 41 may be removed entirely.

As in FIG. 5 of the embodiment, when the hole 41a is formed in the metal layer 41 corresponding to one jetting port 44a, the jetting port 44a is enclosed by the metal layer 41 throughout the periphery. Therefore, from a point of view of protection of the area around the jetting port 44a, the arrangement in the embodiment is more preferable than the arrangement in FIGS. 10A and 10B. The adhesion strength of the liquid repellent film 43 formed on the stacked body 42 after the process of removing the metal layer 41, with respect to the resin layer 40 is higher than the adhesion strength of the liquid repellent film 43 with respect to the metal layer 41. Consequently, in a case of forming the liquid repellent film 43 on the entire area of the stacked body 42, smaller the area due to covering of the resin layer 40 by the metal layer 41, higher is the adhesion of the liquid repellent film 43, and the liquid repellent film 43 is hardly exfoliated. In other words, from a point of view of preventing exfoliation of the liquid repellent film 43, widening the area of the metal layer 41 to be removed as shown in FIG. 10A and FIG. 10B, is preferable.

The method of preparing the stacked body 42 in which the resin layer 40 and the metal layer 41 are stacked without intervening an adhesive is not restricted to the cast method exemplified in the embodiment It is possible to adopt a so-called lamination method which is a method of sticking without using an adhesive, by pressing while heating a resin film having a thermocompression resin layer on a surface thereof.

Moreover, the metal layer 41 may be formed as a film on the surface of the resin layer by using a known technology for forming a thin metal film, such as vapor deposition, sputtering, or electroless plating. In the abovementioned technology for forming a thin film, a technology of patterning a thin metal film on a substrate by using a mask has been well-established, and it is possible to form the metal layer 41 only on a desired area of the resin layer 40. In this case, after forming the metal layer 41 on the entire surface of the resin layer 40, it is not necessary to carry out again the process of removing a part of the metal layer 41 by a method such as etching. In other words, the process of stacking the resin layer 40 and the metal layer 41, and the process of removing are to be carried out simultaneously.

The stacked structure 42 which becomes the substrate of the nozzle plate 39 is not restricted to be a two-layered structure of one resin layer 40 and one metal layer 41. For instance, the metal layer 41 may be a multi-layered structure in which a plurality of different types of metals is stacked. Moreover, a ceramics layer may be stacked on the metal layer 41. For instance, a diamond-like carbon (DLC) may be stacked on the surface of the metal layer 41 for improving an abrasion and wear resistance.

What is claimed is:
1. A liquid droplet jetting apparatus configured to jet a liquid, comprising:
   a nozzle plate in which a nozzle configured to jet the liquid is formed; and a channel structure in which a liquid channel communicating with the nozzle is formed, and joined to the nozzle plate, wherein the nozzle plate includes a resin layer and a metal layer which are stacked without intervening an adhesive therebetween, the resin layer is exposed partially through the metal layer, and the nozzle is formed to open at an area of the resin layer exposed through the metal layer.

2. The liquid droplet jetting apparatus according to claim 1, wherein a liquid repellent film is formed in an area surrounding the nozzle or the area of the resin layer which is exposed through the metal layer.

3. The liquid droplet jetting apparatus according to claim 2, wherein the liquid repellent film is a polytetrafluoroethylene film.

* * * * *